July 17, 1956    H. N. RIKER    2,754,931
LUBRICATING DEVICE
Filed Sept. 3, 1953

INVENTOR
HERBERT N. RIKER
By Arthur H. Sturges.
ATTORNEY

United States Patent Office 2,754,931
Patented July 17, 1956

2,754,931

LUBRICATING DEVICE

Herbert N. Riker, Omaha, Nebr.

Application September 3, 1953, Serial No. 378,255

3 Claims. (Cl. 184—14)

This invention relates to lubricating devices of the type adapted to be actuated by the vibrating or reciprocating action of a traveling vehicle, and in particular a small reservoir having a threaded nipple or a network of tubes extended therefrom and adapted to be threaded into openings in bearings and the like for grease fittings, such as zerk or alemite fittings, and a motion actuated pump mounted on the reservoir and adapted to supply pressure to oil or the like in the reservoir.

The purpose of this invention is to provide a lubricant reservoir that is adapted to be installed in conventional grease fitting openings of bearings and the like whereby lubricant is continuously forced into a bearing as a vehicle of which the bearing forms a part is in motion.

Various attempts have been made to utilize the reciprocating action of a wheel or other part of a vehicle in motion to pump or force lubricants into bearings and other parts of vehicles, however, such devices require space, and in numerous instances sufficient space for a conventional lubricator is not available.

With this thought in mind this invention contemplates removing the conventional grease fittings and replacing the fittings with a small lubricant reservoir that feeds lubricant through the opening continuously as the vehicle on which the device is installed is operating, and the reservoir may be provided with a pump adapted to be actuated by the reciprocating action, for forcing the lubricant through the opening.

The object of this invention is, therefore, to provide a lubricant applicator that is adapted to be installed in a conventional grease fitting opening of a vehicle or other machine.

Another object of the invention is to provide a lubricant applicator adapted to be installed in a grease fitting opening of a machine in which the applicator is actuated by pressure created by the motion of the machine.

Another important object of the invention is to provide a lubricant applicator that is adapted to be installed in conventional grease fitting openings of vehicles and particularly farm machinery and that is operated by shocks and jars resulting from travel of the vehicle in which the operating parts of the applicator are protected from dust, dirt, water and the like.

It is yet another object of the invention to provide a lubricating device actuated by the motion of a vehicle while traveling in which one device is adapted to supply lubricant to a plurality of bearings or other parts.

A further object of the invention is to provide a bellows type pump for supplying pressure to a lubricant applicator in which a weight in the upper part of the bellows is actuated by reciprocating action resulting from shocks, jars, and vibrations of a traveling vehicle to provide a pumping action which, in combination with check valves, supplies air under pressure.

A still further object of the invention is to provide a lubricant applicator adapted to be installed in a conventional grease fitting opening and operated by the motion of a vehicle in which the applicator is of a simple and economical construction.

With these and other objects and advantages in view the invention embodies a container having a threaded nipple extended from the lower end and a ball check valve in the upper end, with the valve positioned to admit air into the container, and a bellows type pump mounted over the valve and having a ball check valve with a goose neck inlet connection extended therefrom in the upper end.

Other features and advantages of the invention will appear from the following description taken in connection with the drawings, wherein.

Figures 1, 2:
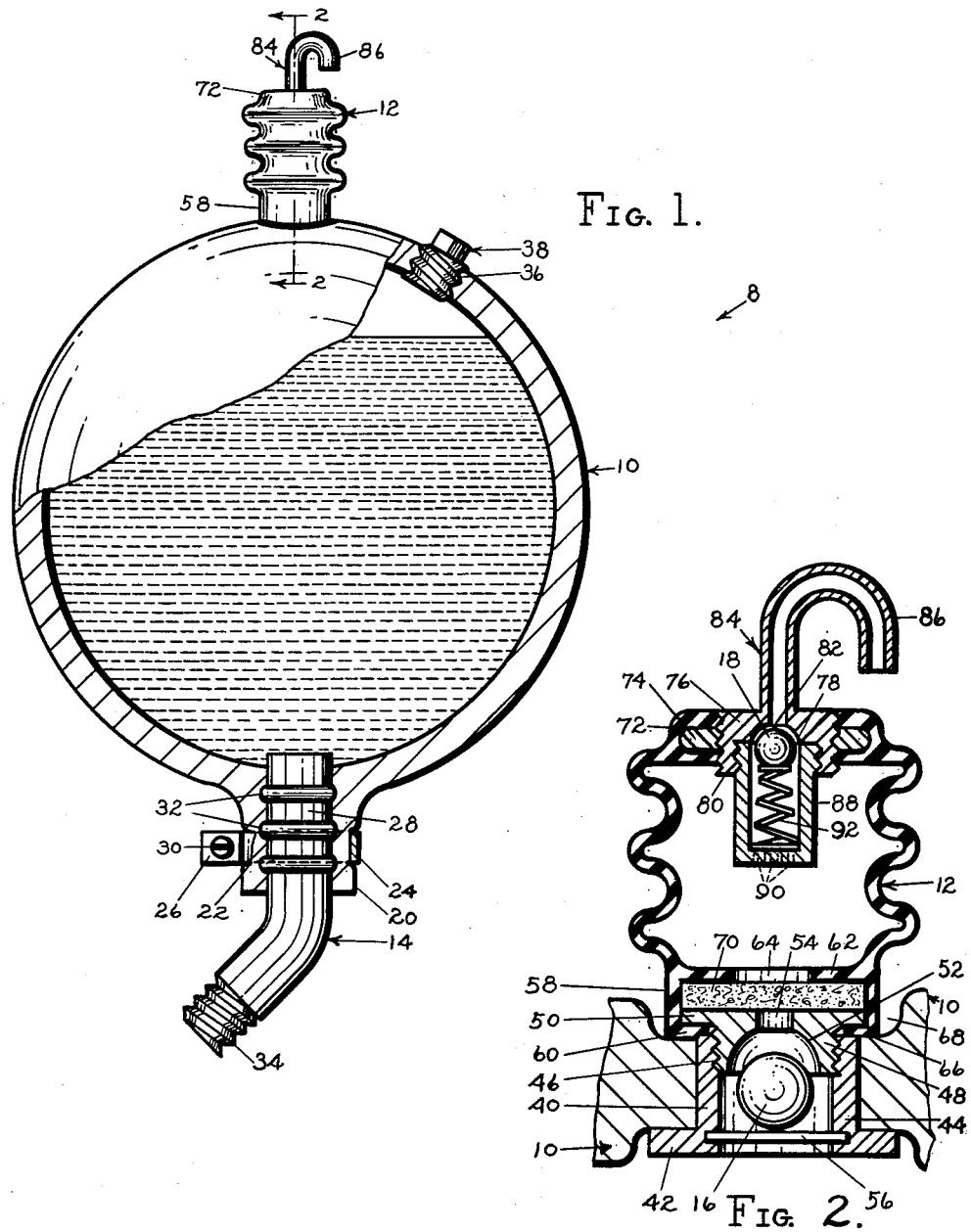
Figure 1 is an elevational view, with the parts shown on an enlarged scale, illustrating the improved lubricant applicator with the bellows type pump on the upper end and with part broken away and shown in section to show the nipple connection at the lower end of the reservoir.
Figure 2 is a vertical section through the pump portion of the applicator taken on line 2—2 of Figure 1.

While one embodiment of the invention is illustrated in the above-referred-to drawings, it is to be understood that they are merely for the purpose of illustration, and that various changes in construction may be resorted to in the course of manufacture, in order that the invention may be utilized to the best advantage according to circumstances which may arise, without in any way departing from the spirit and intention of the device, which is to be limited only in accordance with the appended claims.

And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 8 refers to the invention in its entirety, numeral 10 a globular container providing an oil reservoir, numeral 12 a corrugated sleeve of flexible material providing a bellows, numeral 14, a threaded nipple extended from the lower end of the container, numeral 16 a ball of a check valve in the upper part of the container, and numeral 18 a ball of a check valve in the upper part of the bellows or pump.

The container 10, which is formed of non-brittle, substantially clear plastic, or other suitable material, is provided with a boss 20 on the lower end and the boss is provided with an annular recess 22 in which a U-clamp 24 having flanges 26, is positioned, and the upper end 28 of the nipple is clamped in the boss with a bolt 30 which extends through the flanges 26. The upper end 28 of the nipple is provided with spaced annular ribs 32 and the lower end is provided with threads 34 with which the nipple may be threaded into a grease fitting opening of a bearing or the like, or into a multiple fitting from which similar nipples or tubes may extend for connecting the reservoir to a plurality of bearings or the like.

The upper part of the container 10 is provided with a filling opening 36 into which a plug 38 is threaded for sealing the opening.

The upper part of the container is also provided with an opening 40 in which a bushing having a flange 42 on the lower end is positioned, as shown in Figure 2, and the upper end of the cylindrical body 44 of the bushing is provided with internal threads 46 into which a nut 48 having a flange 50 on the upper end, an arcuate valve seat 52 in the lower part, and an opening 54 therethrough, is threaded. A pin 56 extends across the lower end of the bushing to prevent the ball 16 accidentally dropping into the container. With the valve arranged in this manner air may be drawn into the container, however, as oil in the container is splashed upwardly by the motion of the vehicle the ball will be carried against the seat 52 and thereby prevent the oil being splashed from the container.

The bellows 12 is provided with a cylindrical lower section 58 having an inwardly extended annular flange 60 in the lower end and a partition 62 with an opening 64 therein spaced from the flange, and the bellows is secured to the container by stretching the flange 60 over the flange 50 of the bushing nut 48 whereby with the bushing rotated by the flange 42 the flange 50 is drawn downwardly clamping the flange 60 against the surface 66 of a recess 68 in the upper end of the container and providing a counterbore for the opening 40. A disc 70 of felt, or other suitable filtering material, is provided in the section 58 between the flange 50 and partition 62 to provide a filter.

The upper end of the bellows is formed with an annular recess 72 in which an internally threaded ring 74, of metal or other material suitable for providing a weight, is positioned and the weight is threaded on a bushing 76 having a valve seat 78 for the ball 18 therein. The bushing 76 is also provided with a circular internally threaded recess 80 in the lower end and an opening 82 in the upper end from which a tube 84 having an inverted U-shaped upper end 86 extends.

A cup-like ball housing 88 having perforations 90 in the lower end is threaded into the recess 80, and a spring 92, positioned in the housing 88, retains the ball 18 against the seat 78, as shown.

With the parts assembled in this manner upward movement of a bearing or other part of a machine upon which the applicator is mounted causes the weight 74 to move downwardly in relation to the bellows, or remain stationary, whereby the area in the bellows is reduced and air therein is driven through the lower end forcing the ball 16 away from its seat so that the air passes into the container below; and downward movement of the device results in the weight having a tendency to remain where it is whereby the bellows expands drawing the ball 18 away from its seat and drawing air into the bellows.

Where the pump is actuated by vibrations the travel of the upper end of the bellows and weight is comparatively slight, however, with the device operating continuously as a vehicle or machine is in motion pressure, sufficient to feed lubricant to bearings and the like, will build up in the upper part of the container.

The container 10 may also be used without the pump or bellows, as with upward movement of the part upon which the container is mounted the ball 16 will drop, as shown in Figure 2, and air will be drawn into the container by vacuum resulting from oil passing through the nipple 14.

The device is shown on a comparatively large scale in the drawings as it will be understood that the nipple 14 is adapted to be threaded into the small grease fitting opening in the upper part of a bearing or the like, and in many instances there is not much space above the opening. In the drawing the nipple 14 is shown extended at an angle, and it will be understood that the nipple may be of any suitable shape or design and may extend upwardly or downwardly or at any suitable angle.

Furthermore, it will also be understood that the pump unit or bellows shown in Figure 2 may be used independently of the container and may be used for other purposes, as may be desired.

From the description it is apparent that the new lubricating device provides continuously operating means for metered flowing of lubricating oil and other liquids from a reservoir to bearings and fittings of vehicles and other farm machines, and also of other types of machines, and in combination with the pump or bellows provides means for forcibly injecting lubricating oil into bearings and other parts where forced injections are necessary.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent, is:

1. A lubricant applicator comprising a container, a mounting nipple extended from the lower end of the container, said container having an intake opening in the upper end, a sleeve having annular corrugations therein mounted in said intake opening and positioned to extend from said container, a check valve positioned in the opening of the container for admitting air from the sleeve to the container with the reciprocating action of a device upon which the device is mounted, and to prevent fluids passing from the container to the sleeve, a weight in the extended end of the sleeve, and a check valve mounted in the weight and positioned to admit air to the sleeve as the sleeve extends and prevent fluids passing from the upper end of the sleeve as the sleeve contracts.

2. In a lubricating device, the combination which comprises a globular container having an outlet opening in the lower end and an inlet opening and also a filling opening in the upper part, a mounting nipple having a threaded extended end positioned in the outlet opening of the container, a sealing plug threaded in said filling opening, a sleeve having annular corrugations therein providing a bellows mounted in said inlet opening of the container and extended from the container, a check valve mounted in said inlet opening and positioned to admit fluid from the bellows to the container with the reciprocating action of a device upon which the device is mounted, and to prevent fluid passing from the container to the bellows, a filtering disc positioned in the lower part of the bellows, an internally threaded ring positioned in the upper end of the bellows, a bushing having a check valve therein threaded in said ring, said ring providing a weight and said check valve positioned to permit air to pass into the bellows as the bellows expands and prevent fluid passing from the upper end of the bellows as the bellows contracts, and an inverted U-shaped tube extended from said bushing providing an inlet air passage through the check valve into the bellows.

3. In a lubricant applicator, the combination which comprises a container having a mounting nipple extended from the lower end and an inlet opening in the upper end, a corrugated sleeve providing a bellows mounted in the inlet opening of the container, a check valve in said inlet opening positioned to permit fluid to pass from the sleeve into the container, and a check valve in the upper end of the sleeve and positioned to permit air to pass into the sleeve, said check valve in the upper end of the sleeve providing a weight whereby with upward movement of the container the weight compresses the sleeve forcing fluid from the sleeve into the container and with downward movement of the container the weight extends the sleeve drawing fluid in through the valve in the upper end thereof.

References Cited in the file of this patent

UNITED STATES PATENTS

| | | |
|---|---|---|
| 312,204 | Houck | Feb. 10, 1885 |
| 1,029,496 | Garlock | June 11, 1912 |
| 1,668,510 | Martin | May 1, 1928 |
| 1,955,161 | Zerk | Apr. 17, 1934 |

FOREIGN PATENTS

| | | |
|---|---|---|
| 551,737 | Great Britain | Mar. 8, 1943 |